June 1, 1926.
J. M. CLARK
1,587,147
TREATMENT OF STORAGE BATTERY GASES
Filed July 18, 1922
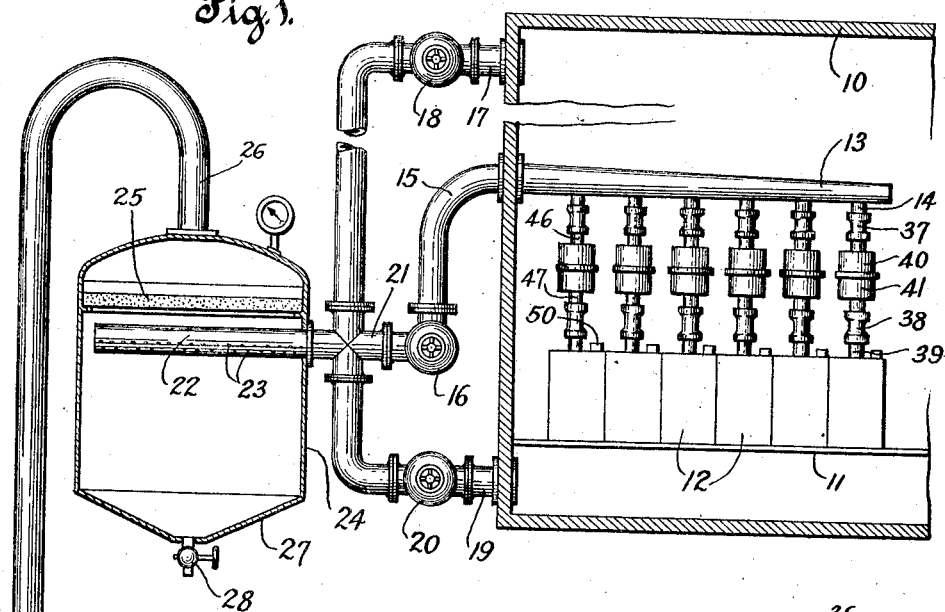
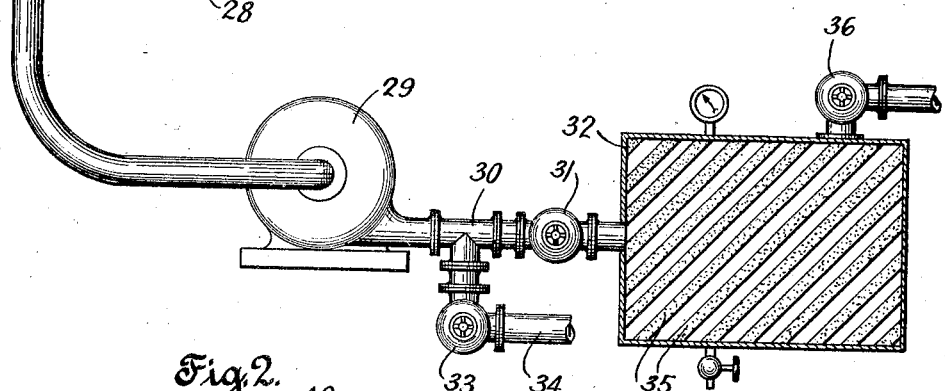
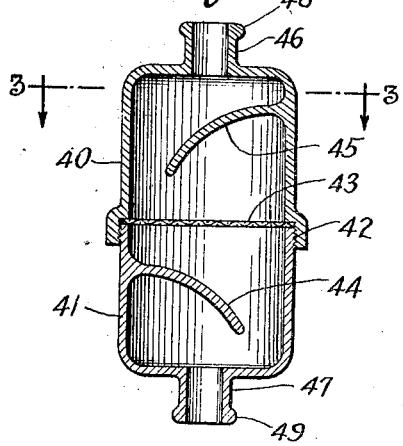
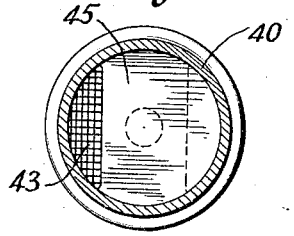
Inventor
John M. Clark
By his Attorney Patented June 1, 1926.

1,587,147

UNITED STATES PATENT OFFICE.

JOHN M. CLARK, OF WHITESTONE, NEW YORK.

TREATMENT OF STORAGE-BATTERY GASES.

Application filed July 18, 1922. Serial No. 575,833.

One of the objections to the use of storage batteries on submarines or in any other place where perfect ventilation cannot be obtained is the danger resulting from the formation of gases during the charge or discharge of the battery. The gases thus formed are not only injurious to the health of the operator, but are also explosive, making them doubly dangerous in confined places.

Suggestions have been made in the past of means for eliminating these dangerous gases and some means have been employed. A careful study of these means does not demonstrate their efficiency or ultimate practicability on submarines because of the obvious lack of free air and because of the waste of electrolyte taken over by the exhausting means.

In this application I will attempt to show and describe means for overcoming all of the objections thus far discovered and I will set forth in detail the mechanisms that I employ.

The accompanying drawing should be referred to for a complete understanding of the specification which follows:—

In the drawing:—

Fig. 1, is an elevation, partly in section, showing a battery room, a battery and my mechanisms.

Fig. 2, is an enlarged sectional view of a part removed, and

Fig. 3, is a transverse, sectional view of this part.

At 10, I show what may be considered the walls of a battery room and arranged therein is an elevated floor or platform 11 upon which will be placed, and secured if desired, the cells 12 of a battery.

Over the cells and at proper distance therefrom is a manifold 13 which may be a pipe of properly treated metal or of clay or other suitable material and over the manifold 13, a nipple 14 is provided for each of the cells 12.

The manifold 13 is carried through the wall of the battery room and as shown in drawing terminates in an elbow 15, connected by a suitable flange to a valve 16. High up in the battery room and approximating the ceiling thereof, another pipe 17 is arranged having its open end projecting into the room and exterior of the room a valve 18 is arranged in the pipe 17.

Low down in the battery room and preferably under the elevated platform 11, a third pipe 19 is arranged, its open end extending into the battery room to a desirable degree and exterior of the battery room a valve 20 is arranged in the pipe 19.

The three pipes 15, 17 and 19 may be brought together in a cross union 21 and to one arm of which is secured a short length of pipe 22, perforated at its under side as shown at 23. This short pipe 22 projects into a chamber or reservoir 24 and arranged in this chamber and over the pipe 23 is a floater 25.

To the upper end of the chamber 24, I connect an air pipe 26. The lower end of the chamber is tapered as shown at 27 and is provided with a drain cock 28.

The air pipe 26 terminates at a rotary blower or exhaust fan 29 which, when operating will cause a vacuum through the pipe 26, the chamber 24 and through any of the pipes 15, 17 or 19, through which the passage is open and if this vacuum is present in the pipe 15 it will also be operative upon the interior of the cells 12, through the connections thereto which I will later describe.

The discharge from the fan 29 will pass into the T 30 and from there through the valve 31 into the cabinet 32 or through the valve 33 and pipe 34.

The pipe 34 may terminate into the free atmosphere, if such is available, but if the device is used on a submarine when submerged and it is desired that the air from the blower 29 be again used, it may be discharged into the cabinet 32 and through suitable screens or filters 35 therein through the valve 36 and back into the atmosphere within the submarine. The screen 35 may be made of slabs of sodium carbonate or other alkaline material or any other material or substance that will neutralize the acid fumes which may be present in the air. This is also true of the filter 25 which may be merely a filter mass of sufficient density to filter out the liquid combined in the air and gases passing through the chamber 24 or may be made of a neutralizing material. I prefer, however, that it merely filter, without neutralization so that acid carried over to this point may be preserved and collected and returned to the batteries.

Connected to the nipples 14 are flexible rubber nipples or connections 37 and other flexible rubber nipples or connections 38 are arranged on the tubes 39 of the cells 12. Between the flexible members 37 and 38 I arrange a liquid separator as shown in section in Fig. 2. This separator may be formed of hard rubber or other suitable material and in two parts as shown at 40 and 41. The parts may be screw-threaded together as shown at 42 and between the parts I will arrange a screen 43. Baffles 44 and 45 are arranged in two parts of this device and nipple projections 46 and 47, each provided with a flange as shown at 48 and 49 are provided for the reception of the flexible members 37 and 38.

Gases thrown off by a storage cell under charge or discharge are saturated with acid. If this were not so the electrolyte in the cells would not have its level appreciably lowered. These saturated acid fumes deposit their liquids upon any point where condensation can take place with a result that connections are destroyed and all metallic parts local to or associated with the battery or battery room are soon eaten away. It is my desire to as far as possible limit the amount of acid or liquid thrown off by the battery in service. I do this by drawing away the gases and to completely and quickly as possible separate out the liquid from the gases, returning the liquid to the cells and I have found that a great percentage of the liquid or moisture will be separated out by the device shown in Fig. 2.

While I believe that the device here shown will effectively care for the gases thrown off by the storage battery, it is well known that most fugitive gases; such as chlorine gases and dry sulphuric acid gases will escape through the battery connections and vents and if allowed to these gases will collect within the battery room, the chlorine gases low down near the floor and the acid gases high up. I, therefore, provide means which may be alternately employed for removing these gases. The means are the pipes 17 and 19 and their connections, both of which are provided with valves making their selective operation readily possible.

The passage 34, which may be an upward passage may be eliminated. The filter chamber 35 may be eliminated, if the chamber 34 is provided with neutralizing means 25 as described and other modifications may be made within the scope of the appended claims without departing from the principle or sacrificing the advantages of the invention.

Having carefully and fully described my invention, what I claim and desire to obtain by Letters Patent is:—

1. The combination with a storage battery and a battery room of a means for removing the gases therefrom, said means including in the order named, an entrained moisture removing means, a manifold, a suspended moisture removing means, a suction producing means, a neutralizing means and a discharge.

2. A device of the character described having a chamber under pressure, means for producing said pressure, means for connecting the suction side of said pressure producing means to a battery and battery room and means within said chamber for filtering and neutralizing the gases received from said battery and battery room.

3. A device of the character described having a chamber under pressure, means for producing said pressure, means for connecting the suction side of said pressure producing means to a battery and battery room, means within said chamber for filtering and neutralizing the gases received from said battery and battery room and means between the battery and the suction producing means though away from said battery for removing the sensible moisture from the discharge from the battery.

4. In a device of the character described comprising means for subjecting the cells of a battery to a suction, means for separating and returning the entrained moisture from the discharge of said battery, means for separating the suspended moisture from the discharge of said battery and means apart from said moisture removing means for filtering and neutralizing the discharge of said battery, all combined as herein set forth.

5. In a device of the character described comprising means for subjecting the cells of a battery to a suction, means for separating and returning the entrained moisture from the discharge of said battery, means for separating the suspended moisture and after the entrained moisture is removed, and means for filtering and neutralizing the discharge after its passage through both said moisture removing means, all combined as herein set forth.

Signed at the city, county and State of New York, this 13th day of July, 1922.

JOHN M. CLARK.